United States Patent [19]

Margnelli

[11] 3,957,277
[45] May 18, 1976

[54] LABYRINTH SEAL STRUCTURE FOR GAS TURBINE ENGINE
[75] Inventor: Norman G. Margnelli, Berlin, Conn.
[73] Assignee: United Technologies Corporation, Hartford, Conn.
[22] Filed: Feb. 10, 1975
[21] Appl. No.: 548,863

[52] U.S. Cl. .................................. 277/56; 277/9; 277/166; 415/172 A
[51] Int. Cl.² ........................................ F16J 15/44
[58] Field of Search .................. 277/56, 57, 55, 53, 277/166, 9; 403/343; 415/172 A, 170 A

[56] References Cited
UNITED STATES PATENTS

| 1,111,312 | 9/1914 | Ljungström | 277/57 |
| 1,383,001 | 6/1921 | McGrath | 277/57 |
| 1,386,865 | 8/1921 | Heisler | 277/57 |
| 3,511,577 | 5/1970 | Karstensen | 415/172 A |

Primary Examiner—Richard E. Aegerter
Assistant Examiner—L. Footland
Attorney, Agent, or Firm—Vernon F. Hauschild

[57] ABSTRACT

Mating members, one rotating, the other stationary, each have grooves in facing annular surfaces for receiving rings, some of which rings carry seal strips and other of these rings define lands for engagement by the seal strips. All of the rings are held in place by elongated fasteners extending through aligned openings in the seal rings and in the land defining rings respectively, which fasteners serve to hold these rings in the associated grooves.

10 Claims, 2 Drawing Figures

LABYRINTH SEAL STRUCTURE FOR GAS TURBINE ENGINE

SUMMARY OF INVENTION

This invention relates generally to labyrinth seals for turbine engines, and deals more particularly with a seal structure especially suitable for gas turbine engines of the type having adjacent engine compartments or sections to be segregated from one another in order to separate the fluid in one section from that in an adjacent section.

Conventional labyrinth seals typically include a series of annular lands defined on one of two members, which members are rotatable one with respect to the other, and a matching series of annular sealing strips in the other member, such that these sealing strips and lands permit rotation of these members but which reduce the flow of fluid through the labyrinth.

The labyrinth seal structure of the present invention provides a labyrinth or passageway for such rotating and stationary members such that worn sealing strips, and/or their associated lands, can be conveniently removed for replacement or repair on an individual basis. Annular rings are held in the rotating and stationary members, some of which rings carry the sealing strips, and others the lands. These rings are held in grooves defined for this purpose in the rotating and stationary members respectively, and preferably elongated fasteners such as machine screws or pins or the like are provided to retain the rings in their associated grooves.

DETAILED DESCRIPTION

A gas turbine engine of the type for which the present invention is particularly well suited, usually includes at least one compressor section, a combustor section, and at least one turbine section. It is characteristic of such engines that the fluid handled by each of these sections may be at differing fluid pressures especially with reference to the pressure in an adjacent engine compartment which may be at ambient or other pressure. Sealing devices are therefore required to isolate these compartments or sections from one another.

Figure 1:
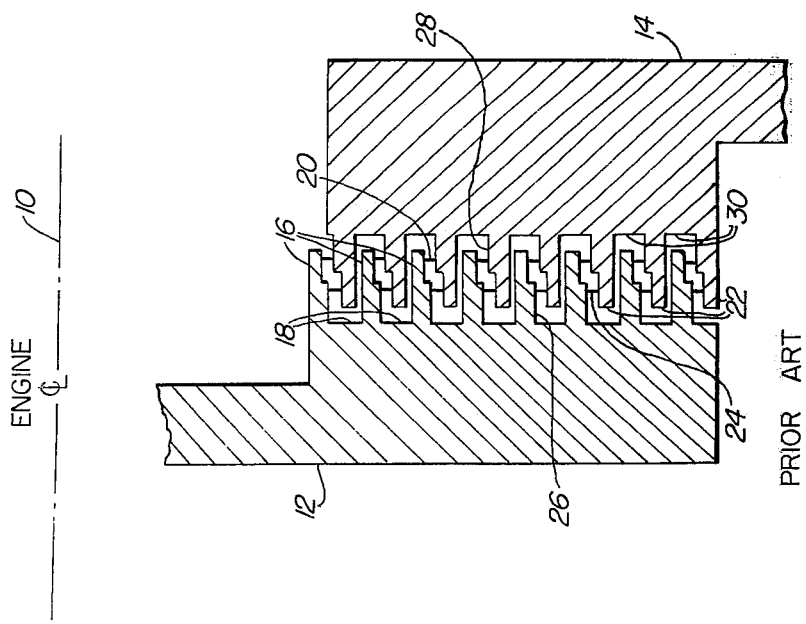
FIG. 1 is a vertical sectional view through the applicable portion of a gas turbine engine of the type equipped with a conventional labyrinth seal structure between a rotating and a stationary member.

Still by way of background, FIG. 1 shows a typical prior art labyrinth seal structure of the type used in such engines. The center line, or longitudinal axis of the engine, is indicated generally at 10, and a rotating member, which may comprise a portion of the compressor or turbine section of the engine for example, is indicated generally at 12. A stationary casing, or housing member 14, is provided adjacent the rotating member 12 and the labyrinth seal structure is defined in part on each of these members 12 and 14 and serves to impede the flow of fluid from one section of the engine to an adjacent compartment or the like.

More particularly, the prior art labyrinth seal structure of FIG. 1 illustrates a rotating member 12 which has a series of generally axially projecting fingers 16, 16 each of which fingers is separated from an adjacent or neighboring finger by a machined groove 18. The fingers 16, 16 and the grooves 18, 18 defined herebetween are annular in configuration and the member 12 is machined to close tolerance and in accordane with conventional practice to provide the configuration shown. Each finger 16 carries at least one annular sealing strip 20, which may be provided adjacent the extremity of the finger 16, or in the alternative several such sealing strips may be provided in spaced relation on a single finger.

The stationary member 14 of FIG. 1 is similarly formed in that the machined grooves 30, 30 define projecting fingers 22 nest with the fingers 16, 16 associated with the rotating member 12, and it is further noted that the sealing strips 24, 24 might either be provided adjacent the end portions of the fingers 22, 22 in the version shown in FIG. 1 or might be provided on an intermediate portion of the fingers 16, 16. These fingers 16, 16 on the rotating member 12 and/or the fingers 22, 22 on the stationary member 14 also define lands, 26 and 28 respectively, which lands are accurately machined with respect to the sealing strips 20 and 24 such that a very close tolerance fit is provided when the engine is operated in order to reduce the flow of fluid from the high pressure side of this labyrinth seal structure to the low pressure side thereof. It will be apparent that the machining of these grooves, 18 and 30, in the members, 12 and 14 respectively, requires holding a very close tolerance in view of the very close tolerances required between the free edges of the sealing strips 20 and 24 and their associated lands 26 and 28 respectively. When these seals become worn or otherwise damaged excessive fluid is allowed to pass through the labyrinth seal structure with the result that the sealing strips must be collectively removed for replacement or repair either in whole, that is by replacement of an entire annular strip, or by removing and replacing sections or segments of the annular sealing strips. Upon reassembly close tolerances must again be achieved so that the components can be reassembled with one another without excessive interference, and without excessive fluid leakage through the labyrinth seal structure.

Figure 2:
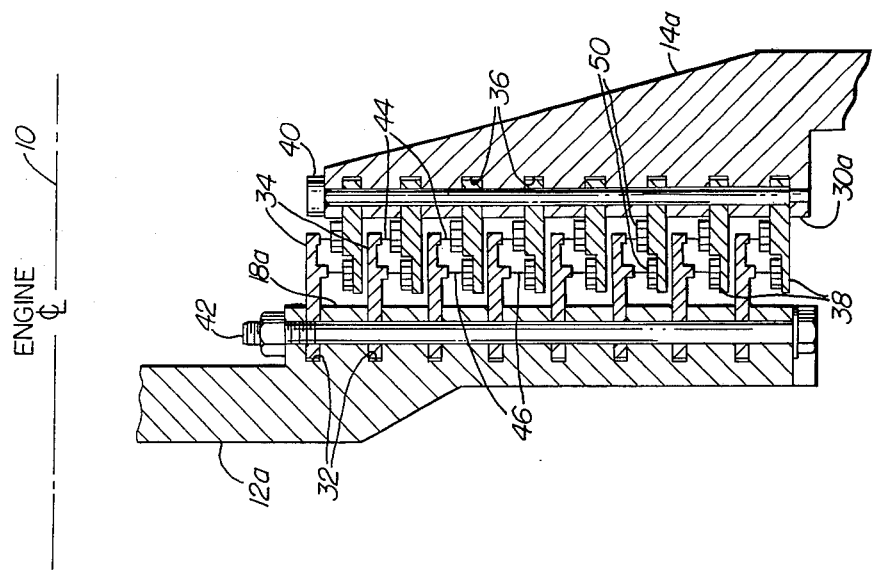
FIG. 2 is a view similar to FIG. 1 but illustrating a labyrinth seal structure incorporating the present invention.

Turning next to a consideration of the improved labyrinth sealing structure depicted in FIG. 2, the center line of the engine is again depicted at 10 and the rotating member corresponding to the member 12 of FIG. 1 is indicated generally at 12a in FIG. 2. The stationary member 14a in FIG. 2 corresponds to that shown at 14 in FIG. 1.

In accordance with the present invention, the rotating member 12a is provided with a first annular surface 18a located in axially spaced relationship with respect to a similarly defined annular surface 30a on the stationary member 14a. The first mentioned annular surface 18a is provided with a plurality of outwardly open grooves 32, 32 each of which is adapted to receive a generally annularly shaped ring 34. Similarly, the second above mentioned annular surface 30a associated with said stationary member 14a is provided with a plurality of grooves 36, 36 each of which grooves is adapted to receive an annularly shaped ring such as indicated at 38, 38. These annular rings are in turn held in place by elongated fastener elements in the form of either a pin 40, or a machine screw 42. Preferably, four such fastener elements are provided in circumaxially spaced relationship around the center line 10 of the engine, and it will be apparent that upon removal of these few fastener elements it is possible to remove, for replacement or repair, one or more of the rings 34 and 38 associated with the rotating and stationary members, 12a and 14a respectively.

The rings 34, 34 associated with the rotating member 12a are provided with two sealing strips or sealing elements, the outermost one of which is located adjacent the end portions thereof as indicated generally at 44, 44 and the innermost one of which sealing rings 46, 46 is located intermediate the annular surface 18a of the rotating member 12a and the projecting end portion of each ring 34. These sealing elements 44 and 46 are conventionally mounted in the sealing rings 34, but rather than providing some of these strips in the rotating assembly, and others in the stationary assembly the presently preferred practice calls for both such sealing elements 44 and 46 associated with each of the rings 34 to project radially outwardly and to be mounted in the rotating assembly as shown in FIG. 2.

The rings 38, 38 associated with the stationary member 14a are preferably provided with lands in the form of annular pads 50, 50 are fabricated from a honeycomb material, or some other suitable seating material, and the free edge portions of the annular seal elements 44 and 46 mate with these relatively abradable pads to provide a durable labyrinth seal structure. Both the rotating and the stationary rings 34 and 38 are provided in associated annular grooves 32 and 36 respectively, and aligned openings defined in the inner portions of the rotating and stationary rings are adapted to receive the fastener elements 42 and 40 respectively. The rotating and fixed members 12a and 14a respectively define associated fastener openings for receiving these elements in parallel relationship to the annular surfaces, 18a and 30a respectively.

Preferably, and as shown in FIG. 2, the lands or pads 50, 50 and their associated seal elements or strips are slightly spaced radially one with respect to another in the assembled seal structure. It should be noted that the tolerances required in the labyrinth seal assembly of FIG. 2 can be more conveniently adhered to as a result of the process of machining the individual rings and grooves in the rotating and/or the stationary member, 12a and 14a respectively, than is the case in the FIG. 1 assembly wherein the projecting fingers 16 and 22 must be precision machined in members 12 and 14 of the FIG. 1 assembly. It is further noted that the seal strips or elements 44 and 46 can be conveniently manufactured at least initially from a single annular sheet metal strip, but that each of these strips can be removed for either replacement in whole or be repaired in segments, that is by cutting out a defective portion of a worn element with the result that a short segment can be used to repair a defective seal. However, the rings 34 and 38, though also annular in shape, are preferably replaced on a per ring basis. In fact, spare rings with assembled seal strips or pads can be stored for use when required, leading to significant time savings during periods of routine maintenance and/or repair.

I claim:

1. A labyrinth sealing structure for use in a gas turbine engine to provide a fluid pressure differential between segregated compartments or sections of the engine comprising spaced rotating and stationary members having facing surfaces, a sealing structure comprising one of said facing surfaces defined by one of said members and having a plurality of spaced annular grooves recessed in said one member and opening in said one facing surface, the other of said members defined by the second of said facing surfaces which is spaced from said first facing surface, annular seal rings supportably received in said grooves and having portions projecting normally beyond said first facing surface, seal elements secured to said projecting portions, spaced annular lands defined adjacent said second facing surface for engagement by said seal elements, and means for releasably retaining said seal rings in said annular grooves.

2. The labyrinth sealing structure according to claim 1 wherein said seal ring retaining means comprises circumaxially spaced elongated fasteners each of which extends through aligned openings in said seal rings and said one member, which fasteners are located adjacent said first facing surface and oriented parallel thereto.

3. The labyrinth sealing structure according to claim 2 wherein each of said seal rings includes two seal elements, the first mentioned seal element located adjacent the end of the projecting portion of said seal ring, and another seal element intermediate the end of said projecting portion and said first facing surface, both said seal elements arranged parallel to one another and to said first facing surface.

4. A labyrinth sealing structure for use in a gas turbine engine to provide a fluid pressure differential between segregated compartments or sections of the engine comprising spaced rotating and stationary members having facing surfaces, a sealing structure comprising one of said facing surfaces defined by one of said members and having a plurality of spaced annular grooves recessed in said one member and opening in said one facing surface, the other of said members defined by the second of said facing surfaces which is spaced from said first facing surface, annular rings supportably received in said grooves and having portions projecting normally beyond said first surface, seating surfaces on each of said projecting portions, spaced annular seal elements adjacent said facing annular surface for engagement with said seating surfaces respectively, and means for releasably retaining said rings in said annular grooves.

5. The labyrinth sealing structure according to claim 4 wherein said retaining means for said rings comprises circumaxially spaced elongated fasteners each of which extends through aligned openings in said rings and said one member, which fasteners are located adjacent said first facing surface and oriented parallel thereto.

6. The labyrinth sealing structure according to claim 5 wherein each of said rings includes two spaced land type seating surfaces, the first above mentioned seating surface located adjacent the end of the projecting portion of said ring, and another land intermediate the end of said projecting portion and said first facing surface, both said lands oriented normal to said first facing surface.

7. A labyrinth sealing structure for use in a gas turbine engine to provide a fluid pressure differential between segregated compartments or sections of the engine, having a longitudinal axis, comprising rotating and stationary members, spaced axially to present facing, radial surfaces, each of said facing surfaces defining a plurality of spaced annular grooves concentric about said axis, rings supportably received in said grooves and having portions projecting normally beyond said facing surfaces, certain of said projecting rings portions having circumferential seating surfaces defined thereon, and radially extending seal ring elements carried by other of said projecting ring portions for engagement with said seating surfaces, and means for releasably axially retaining said rings in said grooves.

8. The labyrinth sealing structure according to claim 7 wherein said ring retaining means comprises circumaxially spaced elongated fasteners each of which extends through aligned openings in certain of said rings and said stationary member.

9. The labyrinth sealing structure according to claim 8 wherein said ring retaining means further includes circumaxially spaced elongated fasteners extending through aligned openings in said other rings and said rotating member.

10. The labyrinth sealing structure according to claim 9 wherein said certain rings each defines two spaced circumferential seating surface lands, and wherein said other rings carry two radially extending seal ring elements for engagement with said seating surface lands.

* * * * *